UNITED STATES PATENT OFFICE 2,072,143

SYNTHETIC RESINS AND COMPOSITIONS CONTAINING THE SAME

Richard T. Ubben, Wilmington, Del., assignor to E. I. du Pont de Nemours & Company, Wilmington, Del., a corporation of Delaware No Drawing. Application May 24, 1934
Serial No. 727,284

15 Claims. (Cl. 260—4)

This invention relates to hydrogenated aldehyde-phenol resins, to process for their preparation and to compositions containing them.

An object of the invention is the preparation of improved resinous bodies from resinous polymeric aldehyde-phenol condensation products.

Another object of the invention is the production of resins, of the type indicated, having superior solubility and light-stability characteristics and especially adapted for use in the manufacture of oleoresinous varnishes and cellulose derivative coating and plastic compositions.

A still further object of the invention is the preparation of new and improved compositions, adapted particularly for coatings, and comprising a hydrogenated aldehyde-phenol resin together with a drying oil or other ester-like body having drying properties. An additional object of the invention is the conversion of heat-hardenable aldehyde-phenol resins to a non-heat-hardenable form.

Other objects and advantages of the invention will be apparent from the following specification in which its preferred embodiments are described.

In accordance with the invention it has been found that new plastic bodies, having properties adapting them for important uses in the art, are obtained by contacting resinous polymeric aldehyde-phenol condensation products with hydrogen in the presence of a hydrogenating catalyst and under conditions adapted for substantial reaction of hydrogen with the resin. Especially important and valuable improvements are effected in the case of those resins which before hydrogenation are of the heat-hardenable type, "heat-hardenable" having reference, as will be understood, to the relative ease with which the resins may be rendered insoluble and infusible by suitable heat treatment.

For a proper appreciation of the objects, importance and basic nature of this invention, it is necessary that the following background of the art be clearly comprehended. Common varnish-making procedures, prior to the advent of synthetic resins, and also to a large extent since their development, have consisted simply in heating a natural resin, such as ordinary rosin, with a natural vegetable drying oil, such as linseed or China-wood oil. When and as synthetic resins became available, the art immediately attempted to substitute them for the natural resins. However, it was learned thru experience that synthetic resins generally, because they are very different from natural resins in physical properties and chemical constitution and behavior, cannot generally be used to replace rosin in varnish-making. The art then began to search for methods specific to utilizing not only each class of resin but also the several members of each class. Because of their importance and early development, phenol-aldehyde resinous condensation products have received a full share of attention. One result of such research has been the development of numerous methods—based largely on auxiliary ingredients—which purport to be suitable for making homogeneous varnishes from phenol-aldehyde resins generally. Another result has been the selection of those particular phenol-aldehyde condensation products which are most suited for making varnishes by the old, well-established method of simply heating with the drying oil. Selections of the latter nature have led to certain generalizations regarding that chemical structure of the phenol which produces oil-solubility. A very important and basic contribution to the art was made by Hönel (U. S. Patent 1,800,296) who discovered that the phenols from which the formaldehyde condensation products were made should have not more than two unsubstituted positions ortho and/or para to the phenolic hydroxyl group or groups. The explanation of this is that a condensation product prepared from such a phenol has little, if any, tendency on heat treatment to be converted to an infusible, insoluble resin; such a requisite is obviously necessary because otherwise an inhomogeneous mass would be obtained on heating with the oil. Now the Hönel patent was concerned only with non-resinous aldehyde-phenol condensation products, which are not the type desired by the varnish trade. The next major discovery was made by Brubaker (U. S. appl. Ser. No. 662,001, filed March 21, 1933) who learned that certain further structural requirements were necessary if the phenol-aldehyde condensation product was to be converted first to the hard, brittle (tho still non-heat-hardenable) type of product desired by the varnish trade. Thus the field of suitable resins was narrowed a second time.

A parallel problem which has confronted the phenol-aldehyde resin and varnish art is the development of resins and resin varnishes which are not subject to discoloration on exposure to light in film form. It has been fairly definitely determined that this defect (which is notorious with ordinary phenol-formaldehyde resins) is inherent in the phenols. An obvious solution of this problem is, therefore, the proper selection of the phenol and work along these lines by numerous investigators has demonstrated rather definitely that discoloration is more or less decreased, sometimes almost wholly prevented, if the phenol from which the resin is made has all the positions para to the phenolic hydroxyl blocked by a tertiary aliphatic carbon atom. This is supposed to be due to the prevention of a quinoid-like degradation of the phenol to colored by-products.

From a consideration of the above, it will be readily admitted that a very fine selection of phenols, representing a very narrow portion of the field, must be made for synthesizing a phenol-aldehyde resin having physical properties acceptable to the varnish trade, and having chemical properties which permit it to be blended by common methods with drying oils to form varnish bases of reasonable resistance to discoloration. Moreover, as in the case of all chemical generalizations, there are isolated, unexplainable anomalies which narrow the field even more.

There is still another problem in the preparation of phenol-aldehyde varnish resins which has never been solved to any satisfactory extent. Rosin is soluble in hydrocarbon solvents and the latter, an economical type of solvent, are accordingly suitable for rosin-drying oil varnishes. However, phenol-formaldehyde resins are not generally soluble in hydrocarbons, and the varnish bases made therewith accordingly require large proportions of expensive oxygenated solvents.

The present invention, directed to the production of new resins by hydrogenation of aldehyde-phenol resins, presents a satisfactory solution to all the above problems. More specifically, the advantages of this invention for particular classes of aldehyde-phenol resins are:

I.—Heat-hardenable resins are rendered
  A. Non-heat-hardenable
  B. Oil-soluble
  C. Discoloration-resistant (where initially subject to discoloration)
  D. Soluble in hydrocarbons II.—Non-heat-hardenable resins are rendered
  A. Oil-soluble (where initially oil-insoluble)
  B. Discoloration-resistant (where initially subject to discoloration)
  C. Soluble in hydrocarbons (or more soluble if already soluble to some extent)

III.—Non-heat-hardenable, oil-soluble resins are rendered
  A. Discoloration-resistant (where initially subject to discoloration)
  B. Soluble in hydrocarbons (or more soluble, if already soluble to some extent)

IV.—Non-heat-hardenable, oil-soluble, discoloration-resistant resins are rendered
  A. Soluble in hydrocarbons (or more soluble, if already soluble to some extent)

Summing up, the present invention improves aldehyde-phenol resins in one or more of the following respects: (1) increase in oil-solubility, (2) increase in resistance to discoloration, (3) increase in solubility in hydrocarbons, and (4) conversion of heat-hardenable resins to a non-heat-hardenable form. Finally, the invention involves a radical and basic departure from all methods and efforts of the art because it comprises an effective treatment of the preformed resin and not just another method of making the resin or another selection of ingredients therefor.

In practising the invention the aldehyde-phenol resin is subjected to liquid phase hydrogenation in the presence of a hydrogenation catalyst. Generally, it is preferred to hydrogenate the resin in the form of a solution in an organic solvent, e. g., an alcohol, ether, or ester. The quantity and nature of the solvent used may vary with the particular resin to be hydrogenated, but in general it is preferable to use sufficient solvent to effect complete solution of the resin. As an alternative, but less desirable method, the molten resin may be hydrogenated without use of added solvent.

To the resin in suitable liquid state a hydrogenation catalyst (e. g. nickel supported on kieselguhr) is added, the mixture is placed in an autoclave equipped with agitating means, and subjected to contact with hydrogen, under suitable temperature and pressure conditions, until the desired degree of hydrogenation is accomplished. The catalyst is removed by filtration and the resin recovered by evaporation of solvent if present. The extent of hydrogenation effected in each case will depend upon the degree to which it is desired to modify the properties of the original resin, any substantial addition of hydrogen being effective in producing to some extent the improvement in properties hereinbefore referred to.

Hydrogenation catalysts suitable for use in the process include the metals of the iron and platinum groups. The catalysts may be made by any of the methods well known to the art, and may be employed in the form of a colloidal dispersion in an organic solvent or, preferably, in conjunction with an inert support, e. g. kieselguhr, pumice, active carbon, silica gel, or the like. The preferred catalyst is finely powdered nickel and may be prepared in an active form by a number of methods, but the preferred procedure consists in reducing with hydrogen compounds of nickel containing oxygen, e. g. the carbonate, oxides, hydroxides, etc., salts of an inorganic acid, e. g. chromic acid, vanadic acid, tungstic acid, etc. Suitable temperatures for the reduction of such nickel compounds are found in the range 250–500° C. When reducing chromates by heat alone or together with hydrogen, chromites are formed and these serve as the support for the hydrogenating catalyst. Especially useful for the purpose is finely divided nickel distributed on kieselguhr. An alternative preferred catalyst may be prepared by the digestion of a nickel-aluminum alloy with caustic soda according to the process described in U. S. Patent 1,628,190. The platinum metals have the advantage of more effectively accelerating the desired reaction at atmospheric pressure.

While the invention in its broad aspects is not limited to the employment of any specific conditions of operation, I have found that in order to accomplish any substantial hydrogenation of the resin and to attain the advantages and benefits hereinbefore referred to, it is necessary to effect the hydrogenation at a temperature of at least 140° C. Preferably, the hydrogenation is carried out at a temperature within the range of 140–225° C. and a pressure within the range of 150–4000 lbs. per sq. in. Especially good results have been obtained at 160–180° C. and 1500–2500 lbs. per sq. in.

It may be said in the foregoing connection that it has previously been proposed that the melting point and hardness of certain aldehyde-phenol resins may be increased by subjecting the same to contact with hydrogen in the presence of a catalyst at temperatures not exceeding 100° C. Actual trial of this proposal has shown, however, that under the conditions stated no substantial absorption of hydrogen is effected and none of the improved properties imparted to the resin, in accordance with the present invention, is attained.

As previously indicated the invention broadly involves the preparation of improved resinous products by effective hydrogenation of polymeric resinous aldehyde-phenol condensation products. Another feature of the invention, however, is the application of the hydrogenated products to the manufacture of compositions including said hydrogenated products and one or more other bodies, especially ester-like bodies having drying properties. It should be noted that as regards this feature of the invention there is some difference between the properties of the materials obtained by hydrogenating aldehyde-mononuclear phenol and aldehyde-polynuclear phenol resins. (The term "polynuclear phenol", as used herein, designates monohydric or polyhydric phenols having at least two carbocyclic nuclei, at least one of which is aromatic. The term "mononuclear phenol," on the other hand, designates monohydric or polyhydric phenols containing no more than one cyclic nucleus.) The phenols may contain other substituent groups in addition to the phenolic hydroxyl group and in the case of polyhydric polynuclear phenols, the hydroxyl groups may be in the same or in different aromatic nuclei.

The hydrogenated aldehyde-polynuclear phenol resins, whether initially ( i. e. before hydrogenation) of the heat-hardenable or non-heat-hardenable type, are found to be compatible with oils, especially drying oils (e. g. China-wood oil, sunflower seed oil, linseed oil, oiticica oil, perilla oil, walnut oil, safflower seed oil, etc.) and other ester-like bodies having drying properties. In the last named category are included polyhydric alcohol-polycarboxylic acid resins modified with drying oils, such as the above, or with acids derived from their saponification. The latter resins are well known in the art and no further description thereof is necessary. The ester-like bodies having drying properties are as a rule characterized by low acidity and the property of drying, as films, by absorption of oxygen from the atmosphere.

As to the aldehyde-mononuclear phenol resins, those which are initially non-heat-hardenable and oil-insoluble are rendered oil-soluble by hydrogenation. On the other hand, initially heat-hardenable aldehyde-mononuclear phenol resins, which as a class are oil-insoluble, while not rendered compatible with all of the above ester-like bodies by hydrogenation, are substantially improved as to their solubility therein. This solubility improvement is such, as I have found, that by including certain compatibilizing agents therewith it is possible to employ the hydrogenated heat-hardenable aldehyde-mononuclear phenol resins in the manufacture of varnishes, by heating or otherwise suitably blending the same with one or more ester-like bodies of drying properties, previously referred to. This improvement is of considerable practical importance, since unhydrogenated resins of this class cannot, so far as I am aware, be in any way made compatible with drying oils.

As compatibilizing agents for the purpose just referred to I have found that alcohols generally may be employed. That is to say, I may use not only aliphatic alcohols, either monohydric or polyhydric, straight chain, branched chain, primary, secondary, or tertiary, but also carbocyclic or heterocyclic alcohols. As examples of aliphatic alcohols I cite ethyl alcohol; isopropyl alcohol; isobutyl alcohol; heptyl alcohol; the mixture of oxygenated organic compounds, including alcohols, obtained by catalytic hydrogenation of carbon oxides; and alcohols obtainable by hydrogenation of vegetable oils, such as China-wood oil and cocoanut oil. Suitable carbocyclic alcohols are, for instance, decahydro-beta-naphthol, abietyl alcohol, and dicyclohexanolpropane. Suitable examples of heterocyclic alcohols are furfuryl and tetrahydro-furfuryl alcohols and dimethyl-alpha-thienyl carbinol. Suitable aralkyl alcohols are benzyl and phenylethyl alcohols. A suitable amine alcohol is triethanolamine. Where the blending is effected by heating, alcohols of relatively low volatility, such as those boiling above 200° C., e. g. abietyl alcohol, are preferably used.

The following examples are given as illustrating preferred methods of practicing the invention, altho it is to be understood that the invention is not limited thereto.

*Example 1.*—This example illustrates hydrogenation of an aldehyde-mononuclear phenol resin of the heat-hardenable type.

Production of the resin

To 100 parts of phenol is added 100 parts of 40% formaldehyde and 4 parts by weight of 20% ammonium hydroxide and the mixture is heated under a reflux condenser for about 40–45 minutes. The resulting liquid condensation product is separated from the water, washed, and dried under reduced pressure at 50–60° C. A clear, amber-colored, soft resin, soluble in alcohol and insoluble in hydrocarbon solvents and fatty oils, is obtained. This resin is readily converted to the infusible, insoluble state by heat treatment.

Hydrogenation of the resin

To 196 grams of a 50% ethyl alcohol solution of the phenol-formaldehyde resin as above described is added 10 grams of a nickel-on-kieselguhr catalyst, and the mixture is placed in an autoclave equipped for agitation. A hydrogen pressure of 2000 lbs. per sq. in. is applied and the temperature is brought gradually to 180° C., where it is maintained for 5.5 hours. Hydrogen absorption begins at about 140–150° C., reaches a maximum at about 180° C., and finally decreases towards the end of the heating period. At the completion of the run the catalyst is removed by filtration, and the resin recovered by evaporation of the solvent. The product obtained is a light, amber-colored resin, readily soluble in aromatic hydrocarbon and ester solvents, compatible with polyhydric alcohol-polycarboxylic acid resins and cellulose derivatives, and is not convertible to the insoluble, infusible stage even by heat treatment at about 150° C. for three hours. While not freely soluble in oils, the hydrogenated resin is more soluble therein than the unhydrogenated resin, which is insoluble in aromatic hydrocarbons, incompatible with oils and polyhydric alcohol-polycarboxylic acid resins, and is converted to the insoluble, infusible stage in a few minutes by heat treatment at 150° C.

Varnish manufacture

An oleoresinous varnish may be prepared from the foregoing hydrogenated resin as follows:

| | Parts by weight |
|---|---|
| Hydrogenated resin | 17.2 |
| Abietyl alcohol | 17.2 |
| China-wood oil | 32.8 |
| Blown linseed oil | 32.8 |
| Total | 100.0 |

This mixture is heated 15 minutes at 200–235° C. It is then thinned with an equal weight of a solvent mixture composed of equal parts by weight of toluene and ethoxyethanol. Cobalt drier is added in amount sufficient to give 0.02% cobalt based on the oil. Films require about 24 hours to dry and when dry are perfectly clear, continuous, and tough.

The uncut varnish base is also compatible with cellulose derivatives. Other blending agents that may be substituted for the abietyl alcohol are, for example, decahydro-beta-naphthol and di(4-hydroxycyclohexyl) dimethylmethane. The oil length of the varnish may be varied thruout the scale considered practical in common varnish-making procedures.

*Example 2.*—This example illustrates the hydrogenation of a non-heat-hardening aldehyde-mononuclear phenol-formaldehyde resin.

Production of the resin

To 100 parts of phenol is added 80 parts of 40% formaldehyde and 1.5 parts of ammonium chloride and the mixture is refluxed until the resin separates. The resulting liquid condensation product is separated from the water, washed three times with warm water, and dried under reduced pressure at 55° C. The product obtained is a light, amber-colored resin, soluble in alcohol, insoluble in hydrocarbon solvents, and incompatible with oils and cellulose derivatives. This resin is not heat-hardenable and cannot be converted to the insoluble state even by heating overnight at 140° C. Phenol itself ordinarily yields a heat-hardenable resin, but the above proportions and catalyst are such that heat-hardening is prevented.

Hydrogenation of the resin

To 150 grams of a 50% ethyl alcohol solution of the formaldehyde-phenol resin, prepared as before described, is added 10 grams of a nickel-on-kieselguhr catalyst, and the mixture is hydrogenated in the manner described for the resin of Example 1. The product obtained, after separation of catalyst and evaporation of solvent, is a light, amber-colored resin, readily soluble in hydrocarbons and ester solvents, and compatible with blown oils, oil-modified polyhydric alcohol-polycarboxylic acid resins, and cellulose derivatives. Hydrogenation has markedly improved the solubility and compatibility characteristics of the resin.

Varnish manufacture

An oleoresinous varnish of 12.5 gallons oil length may be prepared from the foregoing hydrogenated resin as follows:

| | Parts by weight |
|---|---|
| Hydrogenated resin | 50 |
| Blown linseed oil | 50 |
| Total | 100 |

The ingredients are mixed in the cold, heated to 232° C. in 25 minutes, and held at that temperature for 15 minutes longer, whereupon a clear light amber-colored varnish is obtained. The varnish is removed from the fire and cut 50% with solvent. To this varnish solution is added a sufficient amount of cobalt-linoleate drier solution to give 0.01% cobalt, based on the weight of the oil. This varnish shows practically no after-yellowing when exposed to light in thin films.

Other aldehyde-mononuclear phenol resins suitable for hydrogenation in accordance with the present invention are, for example, those that may be synthesized from formaldehyde and any one of the following mononuclear phenols: ortho-cresol, para-cresol, para-chlorphenol, para-nitrophenol, para-tertiary butyl phenol, para-tertiary amyl phenol, 3-methyl-6-isopropyl phenol, p-cyclohexyl phenol, 1,2,4-xylenol, creosole, guaiacol, pseudo-cumenol, resorcinol, hydroquinone, meta-dihydroxy toluene, 3,4-dihydroxy toluene, 1,2,3-trihydroxy benzene, 1,2,4-trihydroxy benzene, and 1,3-dihydroxy-4-acetyl benzene.

As previously stated, the properties of aldehyde-polynuclear phenols can also be improved by hydrogenation thereof in accordance with the invention. The following examples are given as illustrative of this aspect of the invention.

*Example 3.*—This example illustrates the preparation and hydrogenation of a typical heat-hardenable, oil-insoluble aldehyde-polynuclear phenol resin obtainable by interreaction of di(4-hydroxyphenyl) dimethylmethane and formaldehyde.

Production of the resin

To 80 grams of sodium hydroxide (2 mols) dissolved in 1000 grams of distilled water is added with stirring 228 grams of di(4-hydroxyphenyl) dimethylmethane (1 mol.), and 200 grams of a 37% formaldehyde solution (2.5 mols), and the mixture is allowed to stand at room temperature for three days. The solution is then neutralized with dilute hydrochloric acid, the oily layer washed three times with warm water, transferred to a shallow tray, and vacuum dried at 55–60° C. for 5 hours. The product obtained is a light amber-colored resin soluble in alcohol, limitedly soluble in ester solvents, and insoluble in hydrocarbon solvents and fatty oils. This resin is readily converted to the infusible, insoluble state by heat-treatment above 100° C.

Hydrogenation of the resin

To 196 grams of a 50% ethyl alcohol solution of the di(4-hydroxyphenyl) dimethylmethane-formaldehyde resin prepared as described above is added 10 grams of a nickel-on-kieselguhr catalyst, and the mixture is placed in an autoclave equipped for agitation. A hydrogen pressure of 2000 lbs. per sq. in. is applied and the temperature is brought gradually to 180–200° C., where it is maintained for 5.5 hours. Hydrogen absorption begins at about 140–150° C., reaches a maximum at about 180° C., and finally decreases toward the end of the period of heating. At the completion of the run the catalyst is removed by filtration, and the resin recovered by evaporation of the solvent. The product obtained is a light amber-colored resin, readily soluble in aromatic hydrocarbon and ester solvents, compatible with drying oils, e. g. China-wood oil, and is not convertible to the insoluble, infusible stage even by heat-treatment at about 150° C. for three hours. The unhydrogenated resin, on the other hand, is insoluble in aromatic hydrocarbons, limitedly soluble in esters, incompatible with oils, and is converted to the insoluble, infusible stage in a few minutes by heat-treatment at 150° C.

Varnish manufacture

An oleoresinous varnish of 25 gallons oil length was prepared from the foregoing hydrogenated resin as follows:

| | Parts by weight |
|---|---|
| Hydrogenated resin | 34 |
| Raw China-wood oil | 66 |
| Total | 100 |

The ingredients were mixed in the cold, heated to 225° C. and held at that temperature for 10 minutes. The varnish was removed from the fire and cut with an equal volume of a solvent containing 50% solvent naphtha and 50% "Hi-flash" naphtha. Cobalt drier (cobalt linoleate) in amount corresponding to 0.01% cobalt, based on the weight of oil, was then added. The varnish was clear and completely homogeneous.

Other heat-hardenable aldehyde-polynuclear phenol resins suitable for hydrogenation in accordance with the invention are, for example, those that may be produced by reaction of formaldehyde with one of the following polynuclear phenols: p,p'-dihydroxy-diphenyl, di(4-hydroxyphenyl)cyclohexane, p,p'-dihydroxybenzophenone, p,p'-dihydroxydiphenyl ether, beta-di(4-hydroxyphenyl)naphthane, 1,1-di(4-hydroxyphenyl)-4-methylcyclohexane, di(4-hydroxynaphthyl)methane, and ar-tetrahydro-beta-naphthol.

*Example 4.*—The practice of the invention may be further illustrated by the hydrogenation of a resin obtainable by condensation of p-hydroxydiphenyl and formaldehyde, this being an example of a non-heat-hardenable aldehyde-polynuclear phenol resin. It is a clear, hard, light colored, brittle material, soluble in aromatic hydrocarbons and in esters, and compatible with oils. However, oleoresinous varnishes or cellulose derivative compositions containing the resin discolor badly when thin films thereof are exposed to light. This defect, as will be readily admitted by the art, is so serious as to almost completely preclude the use of the oil or cellulose derivative-resin compositions in the formulation of varnishes (or of enamels containing light-colored pigments), which in film form are not subject to after-yellowing. This defect is overcome by hydrogenating the resin as in the following paragraph.

To 100 grams of the aforesaid resin dissolved in 150 grams of butyl acetate is added 10 grams of a nickel-on-kieselguhr catalyst. The mixture is placed in a shaking autoclave and agitated for 6 hours at 200° C. under a pressure of 2000 pounds per sq. in. The catalyst is then filtered off, and the resin recovered by evaporation of the solvent.

Altho the hydrogenated resin is similar in some respects to the unhydrogenated product (like the latter material it is compatible in 1:1 ratio with organic cellulose esters and ethers, e. g., ethyl cellulose, benzyl cellulose, crotyl cellulose, cellulose propionate, cellulose isobutyrate, etc.), films of cellulose derivative or oleoresinous coatings prepared from the hydrogenated resin show practically no discoloration on exposure to light. Such an oleoresinous varnish may be made as follows:

Varnish manufacture

| | Parts by weight |
|---|---|
| Hydrogenated resin | 34 |
| Raw China-wood oil | 66 |
| Total | 100 |

The ingredients are mixed in the cold, heated to 232° C. in 25 minutes, and held at that temperature for 15 minutes longer, whereupon a clear, light amber-colored varnish is obtained. The varnish is removed from the fire, and cut 50% with a solvent mixture consisting of equal parts of solvent naphtha and turpentine substitute. To the varnish solution thus obtained is added a sufficient amount of cobalt linoleate drier solution to give 0.01% cobalt, based on the weight of the oil.

The above varnish shows practically no after-yellowing when exposed in thin films to light. The varnish is also of lighter color, and has a lower viscosity at the same solids content than a varnish containing the unhydrogenated resin.

The hydrogenated resins produced in accordance with the invention may be combined either with drying oils, as previously indicated, or with cellulose esters and ethers, especially ethyl cellulose and benzyl cellulose to give highly useful coating compositions. While the compatibilities of hydrogenated aldehyde-polynuclear phenol resins with nitrocellulose are limited, the hydrogenated aldehyde-mononuclear phenols are compatible with nitrocellulose in all proportions.

The following example is illustrative of a lacquer containing a cellulose derivative in combination with a hydrogenated aldehyde-mononuclear phenol resin.

Example 5

| | Parts by weight |
|---|---|
| Hydrogenated resin of Ex. 1 | 7.5 |
| Pyroxylin (dry) | 7.5 |
| Toluol | 50.0 |
| Butyl acetate | 41.5 |
| Ethyl acetate | 15.0 |
| Butyl alcohol | 14.5 |
| Ethyl alcohol | 3.0 |
| Total | 139.0 |

Films cast from the above lacquer are clear and have excellent oil and water-resistance. The unhydrogenated resin is incompatible with cellulose derivatives.

The following example is illustrative of a lacquer containing a cellulose derivative in combination with a hydrogenated aldehyde-polynuclear resin.

Example 6

| | Parts by weight |
|---|---|
| Hydrogenated resin of Ex. 4 | 7.5 |
| Ethyl cellulose | 7.5 |
| Toluol | 25.0 |
| Butyl acetate | 10.0 |
| Ethyl acetate | 50.0 |
| Ethyl alcohol | 7.0 |
| Total | 107.0 |

Films cast from the above lacquer are clear, have excellent oil and water-resistance and are superior in their resistance to discoloration when exposed to light, as compared with similar films containing the unhydrogenated resin. The ethyl cellulose of the above example may be replaced by other organic cellulose derivatives such as those previously mentioned.

Other aldehyde-polynuclear phenol resins that may be hydrogenated in practising the invention are, for example, those synthesized from formaldehyde and any one of the following polynuclear phenols: di(4-hydroxy-3-methylphenyl) dimethylmethane, di(4-hydroxy-3-chlorphenyl) dimethylmethane, di(4-hydroxynaphthyl) methylethylmethane, di(4-hydroxy-3-methylphenyl) ethylmethane, 1,1-di(4-hydroxy-3-methylphenyl) cyclohexane, di(2-hydroxy-5-methylphenyl) dimethylmethane, di(4-hydroxy-3-methylphenyl) phenyl-methane, beta-naphthol, alpha-naphthol, hydroxyxanthones, p-cyclohexylphenol, p-(4-methylcyclohexyl) phenol.

Resins made from phenols containing sulfur should generally be avoided since sulfur poisons most hydrogenation catalysts. Such phenols as di(4-hydroxyphenyl) sulfide and sulfone can, however, be hydrogenated with sulfur-insensitive catalysts.

Altho the preferred aldehyde for the synthesis of the resins used in the practice of this invention is formaldehyde, it may be replaced wholly or in part by such materials as hexamethylenetetramine, methylene chloride, methylal, paraformaldehyde, furfural, benzaldehyde, etc.

It will be apparent from the foregoing that the novel compositions obtained by hydrogenation of aldehyde-phenol resins represent an important advance in the art particularly in view of their improved light stability, compatibility with oils and adaptability to the manufacture of oleoresinous varnishes. It is to be understood that they may be employed in a variety of ways in the manufacture of plastic and coating compositions, in which connection they may be blended with other materials, by heating, with solvents or by other means known to the art, and either with or without cellulose derivatives or the mentioned ester-like bodies having drying properties. Other materials with which the hydrogenated resins may be blended include: other synthetic resins and resin-forming materials, e. g., coumarone-indene resins, amine-aldehyde resins, polyvinyl resins, polyacrylic and polymethacrylic resins; other polyhydric alcohol-polycarboxylic acid resins than the oil-modified types; bitumens, e. g., asphalt; natural and synthetic waxes, e. g., beeswax, candelilla wax, Montan wax, lauryl stearate, and hydrogenated castor oil; non-drying and semi-drying vegetable and animal oils and fats, e. g., castor oil, olive oil, cocoanut oil, cottonseed oil, etc.

To the hydrogenated aldehyde-phenol resins, combined with cellulose derivatives and/or ester-like bodies having drying properties and/or one or more of the above enumerated substances, may be added pigments, solvents, plasticizers, antioxidants, fillers, lakes, etc., as needed and desired and in accordance with methods well known in the art.

In addition to the particular use as non-discoloring coating compositions the hydrogenated aldehyde-phenol resins of this invention per se or combined with any one of the above enumerated materials may be used as molding plastics; as impregnating and coating agents for paper, cloth, porous stone, rubberized fabrics, etc.; as the sandwiching material or adhesive therefor in the manufacture of shatter-proof glass; as adhesives, cements, and sealing waxes for general use; and as binding agents for mica, asbestos, and the like in the manufacture of insulating materials; in the manufacture of sheet and tubular products; as a binder for cotton flock in the manufacture of suede-like materials, etc.

Although in the foregoing specification there have been indicated various proportions of ingredients, temperatures, pressures, etc., it is to be understood that these and other details may be varied within comparatively wide limits without departure from the invention and without sacrifice of any of its substantial benefits and advantages.

I claim:

1. The process which comprises hydrogenating an aldehyde-phenol resin in the presence of a hydrogenating catalyst at a temperature of at least 140° C.

2. The process which comprises hydrogenating an aldehyde-phenol resin in the presence of a hydrogenating catalyst at a temperature within the range of 140–225° C. and a pressure within the range of 150–4000 lbs. per sq. in.

3. The process which comprises hydrogenating an aldehyde-phenol resin in the presence of a nickel catalyst at a temperature within the range of 140–225° C. and a pressure within the range of 150–4000 lbs. per sq. in.

4. The process which comprises hydrogenating an aldehyde-mononuclear phenol resin in the presence of a hydrogenating catalyst at a temperature of at least 140° C.

5. The process which comprises hydrogenating an aldehyde-mononuclear phenol resin in the presence of a hydrogenating catalyst at a temperature within the range of 140–225° C. and a pressure within the range of 150–4000 lbs. per sq. in.

6. The process which comprises hydrogenating an aldehyde-mononuclear phenol resin in the presence of a nickel catalyst at a temperature within the range of 140–225° C. and a pressure within the range of 150–4000 lbs. per sq. in.

7. The process which comprises contacting hydrogen, at a pressure of about 2000 lbs. per sq. in. for about 5½ hrs. at about 180° C., with a 50% ethyl alcohol solution of formaldehyde-phenol resin in the presence of a nickel-on-kieselguhr catalyst, while submitting the mixture to agitation; thereafter removing the catalyst by filtration and recovering the hydrogenated resin by evaporation of the solvent.

8. A hydrogenated aldehyde-phenol resin having improved characteristics as to oil and hydrocarbon-solubility and obtainable by catalytic hydrogenation of an aldehyde-phenol resin at a temperature of at least 140° C.

9. A composition of matter comprising a hydrogenated aldehyde-phenol resin obtained according to the process of claim 2 and at least one film-forming material selected from the group consisting of cellulose esters, cellulose ethers, vegetable drying oils and polyhydric alcohol-polycarboxylic acid resins containing drying oil acid radicals.

10. A hydrogenated aldehyde-phenol resin having improved characteristics as to oil and hydrocarbon-solubility and obtainable by catalytic hydrogenation of an aldehyde-phenol resin in the presence of a nickel catalyst at a temperature within the range of 140–225° C. and a pressure within the range of 150–4000 lbs. per sq. in.

11. A hydrogenated aldehyde-phenol resin having improved characteristics as to oil and hydrocarbon-solubility and obtainable by catalytic hydrogenation of an aldehyde-mononuclear phenol resin in the presence of a hydrogenating catalyst at a temperature of at least 140° C.

12. A composition of matter comprising a vegetable drying oil and a hydrogenated aldehyde-phenol resin obtained in accordance with the process of claim 2.

13. A composition of matter comprising a vegetable drying oil and a hydrogenated aldehyde-mononuclear phenol resin obtained in accordance with the process of claim 2.

14. A composition of matter comprising a vegetable drying oil, an alcohol and a hydrogenated aldehyde-phenol resin (heat-hardenable before hydrogenation) obtained in accordance with the process of claim 2.

15. A composition of matter comprising a vegetable drying oil, abietyl alcohol and a hydrogenated aldehyde-mononuclear phenol resin (heat-hardenable before hydrogenation) obtained in accordance with the process of claim 2.

RICHARD T. UBBEN.